(12) United States Patent
He et al.

(10) Patent No.: US 11,895,336 B2
(45) Date of Patent: Feb. 6, 2024

(54) PICTURE ORIENTATION AND QUALITY METRICS SUPPLEMENTAL ENHANCEMENT INFORMATION MESSAGE FOR VIDEO CODING

(71) Applicant: QUALCOMM Incorporated, San Diego, CA (US)

(72) Inventors: Yong He, San Diego, CA (US); Muhammed Zeyd Coban, Carlsbad, CA (US); Dmytro Rusanovskyy, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 43 days.

(21) Appl. No.: 17/653,945

(22) Filed: Mar. 8, 2022

(65) Prior Publication Data

US 2022/0321917 A1 Oct. 6, 2022

Related U.S. Application Data

(60) Provisional application No. 63/214,378, filed on Jun. 24, 2021, provisional application No. 63/170,267, filed on Apr. 2, 2021.

(51) Int. Cl.
| | |
|---|---|
| H04N 19/70 | (2014.01) |
| H04N 19/136 | (2014.01) |
| H04N 19/172 | (2014.01) |
| H04N 19/16 | (2014.01) |
| H04N 19/12 | (2014.01) |
| H04N 19/46 | (2014.01) |
| H04N 19/184 | (2014.01) |

(Continued)

(52) U.S. Cl.
CPC ............. *H04N 19/70* (2014.11); *H04N 19/12* (2014.11); *H04N 19/136* (2014.11); *H04N 19/16* (2014.11); *H04N 19/172* (2014.11); *H04N 19/184* (2014.11); *H04N 19/46* (2014.11); *H04N 19/60* (2014.11); *H04N 19/85* (2014.11)

(58) Field of Classification Search
CPC ...... H04N 19/70; H04N 19/172; H04N 19/46; H04N 19/85; H04N 19/154
See application file for complete search history.

(56) References Cited

U.S. PATENT DOCUMENTS

| 8,224,127 B2 * | 7/2012 | Woodard | G06V 10/761 |
| | | | 382/209 |
| 8,954,876 B1 * | 2/2015 | Hobbs | G06F 9/452 |
| | | | 715/772 |

(Continued)

FOREIGN PATENT DOCUMENTS

WO      2020231680 A1    11/2020

OTHER PUBLICATIONS

International Search Report and Written Opinion—PCT/US2022/071051—ISA/EPO—dated Jun. 20, 2022.

(Continued)

*Primary Examiner* — Fabio S Lima
(74) *Attorney, Agent, or Firm* — Shumaker & Sieffert, P.A.

(57) ABSTRACT

Video encoders and video decoders are configured to supplemental enhancement information (SEI) messages. The SEI messages may include picture orientation transform type syntax elements that indicate how a picture may be rotated and/or mirrored. The SEI messages may also include quality metrics.

28 Claims, 9 Drawing Sheets

(51) Int. Cl.
    H04N 19/60    (2014.01)
    H04N 19/85    (2014.01)

(56) References Cited

U.S. PATENT DOCUMENTS

| | | | |
|---|---|---|---|
| 10,602,160 B2 | 3/2020 | Kang et al. | |
| 2006/0238444 A1* | 10/2006 | Wang | H04N 19/115 375/E7.172 |
| 2006/0238445 A1* | 10/2006 | Wang | H04N 19/177 345/55 |
| 2012/0230429 A1 | 9/2012 | Boyce et al. | |
| 2013/0124749 A1* | 5/2013 | Thang | H04L 65/613 709/231 |
| 2014/0019593 A1* | 1/2014 | Reznik | H04L 65/762 709/219 |
| 2016/0063343 A1* | 3/2016 | Loui | G06V 20/46 382/195 |
| 2016/0105478 A1 | 4/2016 | Oyman | |
| 2016/0227255 A1 | 8/2016 | Wang et al. | |
| 2018/0091819 A1* | 3/2018 | Cook | H04N 19/30 |
| 2018/0343468 A1* | 11/2018 | Harrell | H04N 19/157 |
| 2019/0081998 A1* | 3/2019 | Reznik | H04L 65/60 |
| 2020/0322587 A1 | 10/2020 | Oh et al. | |
| 2021/0377554 A1* | 12/2021 | Kim | H04N 19/136 |
| 2022/0021723 A1* | 1/2022 | Oyman | H04L 65/80 |
| 2022/0321918 A1 | 10/2022 | He et al. | |

OTHER PUBLICATIONS

Boyce J(Vidyo)., et al., "Display Orientation Information SEI Message", 99. MPEG Meeting, Feb. 6, 2012-Feb. 10, 2012, San Jose, (Motion Picture Expert Group OR ISO/IEC JTC1/SC29/WG11), No. m23499, Feb. 8, 2012 (Feb. 8, 2012), XP030273258, Retrieved from the Internet: URL: http://phenix.int-evry.fr/mpeg/doc_end_user/documents/99_San%20Jose/wg11/m23499-v2-m23499v2.zip, m23499v2.docx [retrieved on Feb. 8, 2012], Sections 1, D.1.26, D.2.

Chen J., et al., "Algorithm Description for Versatile Video Coding and Test Model 13 (VTM 13)", JVET-V2002-v1, Joint Video Experts Team (JVET) of ITU-T SG 16 WP 3 and ISO/IEC JTC 1/SC 29, 22nd Meeting, by teleconference, Apr. 20-28, 2021, pp. 1-103.

Han J., et al., "A Technical Overview of AV1", arxiv.org, Cornell University Library, 201 Olin Library Cornell University Ithaca, NY 14853, XP081876357, arXiv:2008.06091v2 [eess.IV] Feb. 8, 2021, pp. 1-25, section II.

He Y., et al., "IS of ISO/IEC 23090-6 Immersive Media Metrics", International Organisation for Standardisation Organisation Internationale DE Normalisation ISO/IEC JTC 1/SC 29/WG 3 MPEG Systems, ISO/IEC JTC 1/SC 29/WG 03 N0073, Oct. 22, 2020, 28 Pages.

Herglotz C., et al., "Decoding-Energy-Rate-Distortion Optimization for Video Coding", arXiv:2203.01099v1 [eess.IV] Mar. 2, 2022, pp. 1-12.

Herglotz C., et al., "Modeling the Energy Consumption of the HEVC Decoding Process", arXiv:2203.00466v1 [eess.IV] Mar. 1, 2022, 13 Pages.

"Information Technology—High Efficiency Coding and Media Delivery in Heterogeneous Environments—Part 2: High Efficiency Video Coding", ISO/IEC JTC 1/SC 29/WG 11 N 18277, Jan. 18, 2019, 877 Pages.

"Information Technology—MPEG Systems Technologies—Part 10: Carriage of Timed Metadata Metrics of Media in ISO Base Media File Format", ISO/IEC FDIS 23001-10, Jan. 17, 2014, 23 Pages.

"Information Technology—Coded Representation of Immersive Media—Part 2: Omnidirectional Media Format (OMAF) 2nd Edition", DIS stage, ISO 23090-2:2020(E), ISO TC 1/SC 29/WG 11, 2020, 306 pages.

"Information Technology—MPEG Systems Technologies—Part 11: Energy-Efficient Media Consumption (Green Metadata)", ISO/IEC 23001-11, 2015, 93 Pages.

"Information Technology—MPEG Video Technologies—Part 8: Working Practices Using Objective Metrics for Evaluation of Video Coding Efficiency Experiments", ISO/IEC JTC 1/SC 29 /WG 5 N 6, Text for publication of ISO/IEC TR 23002-8, Oct. 16, 2020, 15 Pages.

Oh, M-K., et al., "Region Wise Quality Indication SEI Message", Joint Collaborative Team on Video Coding (JCT-VC) of ITU-TSG 16 WP 3 and ISO/IEC JTC1/SC29/WG11, 27th Meeting, Input Document to JCT-VC, Apr. 2, 2017 (Apr. 2, 2017), No. JCTVC-AA0030, Hobart, AU, XP055516333, pp. 1-4, Retrieved from the Internet: URL: http://phenix.it-sudparis.eu/jct/doc_end_user/documents/27_Hobart/wg11/JCTVC-AA0030-v2.zip [retrieved on Oct. 17, 2018].

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Bjontegaard G., "Calculation of Average PSNR Differences Between RD-curves", VCEG-M33, ITU—Telecommunications Standardization Sector, Study Group 16 Question 6, Video Coding Experts Group (VCEG), 13th Meeting, Austin, Texas, USA, Apr. 2-4, 2001, pp. 1-4.

Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.

Boyce J., et al., "Additional SEI Messages for VSEI (Draft 3)", JVET-V2006-v1, Joint Video Experts Team (JVET) of ITU-T SG 16 WP 3 and ISO/IEC JTC 1/SC 29, 22nd Meeting, by Teleconference, Apr. 20-28, 2021, pp. 1-28.

ETSI TS 126 114, "Universal Mobile Telecommunications System (UMTS); LTE; 5G; IP Multimedia Subsystem (IMS); Multimedia Telephony; Media Handling and Interaction (3GPP TS 26.114 version 14.12.0 Release 14)", ETSI TS 126 114 V14.12.0 (May 2021), 406 Pages.

He Y., et al., "AHG9: Display Orientation Information SEI Message", JVET-V0061-v2, Joint Video Experts Team (JVET) of ITU-T SG 16 WP 3 and ISO/IEC JTC 1/SC 29, 22nd Meeting, by Teleconference, Apr. 20-28, 2021, pp. 1-4.

He Y., et al., "AHG9: Picture Quality Metrics SEI Message", JVET-V0062-v2, Joint Video Experts Team (JVET) of ITU-T SG 16 WP 3 and ISO/IEC JTC 1/SC 29, 22nd Meeting, by Teleconference, Apr. 20-28, 2021, pp. 1-5.

He Y., et al., "AHG9: Picture Quality Metrics SEI Message", JVET-W0085-v2, Joint Video Experts Team (JVET) of ITU-T SG 16 WP 3 and ISO/IEC JTC 1/SC 29, 23rd Meeting, by Teleconference, Jul. 7-16, 2021, pp. 1-5.

Herglotz C., et al., "AHG9: Green Metadata SEI message for VVC", JVET-W0071-v5, Joint Video Experts Team (JVET) of ITU-T SG 16 WP 3 and ISO/IEC JTC 1/SC 29, 23rd Meeting, by Teleconference, Jul. 7-16, 2021, URL: https://jvet-experts.org/doc_end_user/current_document.php?id=10887, JVET-W0071-v3.doc, pp. 1-9.

Herglotz C., et al., "Bit Stream Analyzer for Coding Tool Statistics", JVET-P0085-v2, Joint Video Experts Team (JVET) of ITU-T SG 16 WP 3 and ISO/IEC JTC 1/SC 29/WG 11, 16th Meeting, Geneva, CH, Oct. 1-11, 2019, JVET-P0085-v1 doc, pp. 1-10.

ITU-T H.274: "Series H: Audiovisual and Multimedia Systems Infrastructure of Audiovisual Services—Coding of Moving Video", Versatile Supplemental Enhancement Information Messages for Coded Video Bitstreams, International Telecommunication Union, Aug. 2020, pp. 86.

ITU-T: HSTP-VID-WPOM Working Practices Using Objective Metrics for Evaluation of Video Coding Efficiency Experiments, Technical Paper, Telecommunication Standardization Sector of ITU, Jul. 3, 2020, pp. 13.

Kranzler M., et al., "Decoding Time and Energy Assessment of VTM-10.0 and VVdeC", JVET-T0068-v2, Joint Video Experts Team (JVET) of ITU-T SG 16 WP 3 and ISO/IEC JTC 1/SC 29, 20th Meeting, by Teleconference, Oct. 7-16, 2020, pp. 1-5.

(56) References Cited

OTHER PUBLICATIONS

Kranzler M., et al., "Modeling of the Decoding Energy for VTM-7.0 with a Bit Stream Feature-Based Model", JVET-Q0052-v3, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Segall A., et al., "JVET Common Test Conditions and Evaluation Procedures for HDR/WCG Video", JVET-V2011, Joint Video Experts Team (JVET) of ITU-T SG 16 WP 3 and ISO/IEC JTC 1/SC 29, 22nd Meeting, by Teleconference, Apr. 20-28, 2021, pp. 1-10.

Wang Z., et al., "Multi-Scale Structural Similarity for Image Quality Assessment", IEEE, Proceedings of the 37th IEEE Asilomar Conference on Signals, Systems and Computers, Pacific Grove, CA, Nov. 9-12, 2003, pp. 5.

Wenger S., et al., "Picture Orientation Information", JCTVC-E280-r3, Joint Collaborative Team on Video Coding (JCT-VC) of ITU-T SG16 WP3 and ISO/IEC JTC1/SC29/WG11, 5th Meeting, Geneva, CH, Mar. 16-23, 2011, JCTVC-E280 doc, pp. 1-5.

Ye Y., et al., "Algorithm Descriptions of Projection Format Conversion and Video Quality Metrics in 360Lib Version 12", JVET-T2004-v2, Joint Video Exploration Team (JVET) of ITU-T SG 16 WP 3 and ISO/IEC JTC 1/SC 29, 20th Meeting, by Teleconference, Oct. 7-16, 2020, pp. 1-51.

\* cited by examiner

PICTURE ORIENTATION AND QUALITY METRICS SUPPLEMENTAL ENHANCEMENT INFORMATION MESSAGE FOR VIDEO CODING

This application claims the benefit of U.S. Provisional Application No. 63/170,267, filed Apr. 2, 2021, and U.S. Provisional Application No. 63/214,378, filed Jun. 24, 2021, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data. In particular, this disclosure describes techniques for encoding and decoding messages (e.g., supplemental enhancement information (SEI) messages and/or other packetized structures) that include metadata that assist in processing (e.g., decoding, displaying, etc.) video data. The messages of this disclosure may include syntax elements that indicate the orientation of a picture and/or transforms to apply to decoded pictures that may be used to rotate and/or mirror the decoded picture into a desired orientation. The syntax elements may indicate transforms for an entire picture or constituent pictures (e.g., left and right view stereoscopic pictures) for display. In another example, the messages may include syntax elements that indicate picture quality metrics. The picture quality metrics may indicate the encoding quality of pictures, such as quality-based viewport switching and quality-based metric measurements.

A video decoder or other device may decode the messages and process pictures of video data in accordance with the messages. The picture orientation message may be used to provide, to a video decoder, instructions on recommended orientation transforms to apply to a decoded picture. In this way, the display of the decoded picture may be shown in a more appropriate orientation. A video decoder may use the quality metrics in post processing of a decoded picture, and/or may use the quality metrics to select higher quality pictures to use for inter prediction.

In one example, this disclosure describes a method of processing video data, the method comprising receiving a picture, and coding a picture orientation message that includes a transform type syntax element, wherein the transform type syntax element indicates a transform, from among a plurality of transforms, to be applied to the picture.

In another example, this disclosure describes an apparatus configured to process video data, the apparatus comprising a memory configured to store a picture, and one or more processors implemented in circuitry and in communication with the memory, the one or more processors configured to receive the picture, and code a picture orientation message that includes a transform type syntax element, wherein the transform type syntax element indicates a transform, from among a plurality of transforms, to be applied to the picture.

In another example, this disclosure describes an apparatus configured to process video data, the apparatus comprising means for receiving a picture, and means for coding a picture orientation message that includes a transform type syntax element, wherein the transform type syntax element indicates a transform, from among a plurality of transforms, to be applied to the picture.

In another example, this disclosure describes a non-transitory computer-readable storage medium storing instructions that, when executed, cause one or more processors of a device configured to process video data to receive a picture, and code a picture orientation message that includes a transform type syntax element, wherein the transform type syntax element indicates a transform, from among a plurality of transforms, to be applied to the picture.

In another example, this disclosure describes a method of processing video data, the method comprising receiving a picture, and coding a quality metrics message that includes a quality metric syntax element, wherein the quality metric syntax element indicates a value of a quality metric related to the picture.

In another example, this disclosure describes an apparatus configured to process video data, the apparatus comprising a memory configured to store a picture, and one or more processors implemented in circuitry and in communication with the memory, the one or more processors configured to receive the picture, and code a quality metrics message that includes a quality metric syntax element, wherein the quality metric syntax element indicates a value of a quality metric related to the picture.

In another example, this disclosure describes an apparatus configured to process video data, the apparatus comprising means for receiving a picture, and means for coding a quality metrics message that includes a quality metric syntax element, wherein the quality metric syntax element indicates a value of a quality metric related to the picture.

In another example, this disclosure describes a non-transitory computer-readable storage medium storing instructions that, when executed, cause one or more processors of a device configured to process video data to receive a picture, and code a quality metrics message that includes a quality metric syntax element, wherein the quality metric syntax element indicates a value of a quality metric related to the picture.

The details of one or more examples are set forth in the accompanying drawings and the description below. Other features, objects, and advantages will be apparent from the description, drawings, and claims.

DETAILED DESCRIPTION

This disclosure describes techniques for encoding and decoding messages (e.g., supplemental enhancement information (SEI) messages and/or other packetized structures) that include metadata that assist in processing (e.g., decoding, displaying, etc.) video data. The messages of this disclosure may include syntax elements that indicate the orientation of a picture and/or transforms to apply to decoded pictures that may be used to rotate and/or mirror the decoded picture into a desired orientation. The syntax elements may indicate transforms for an entire picture or constituent pictures (e.g., left and right view stereoscopic pictures) for display. In another example, the messages may include syntax elements that indicate picture quality metrics. The picture quality metrics may indicate the encoding quality of pictures, such as quality-based viewport switching and quality-based metric measurements.

A video decoder or other device may decode the messages and process pictures of video data in accordance with the messages. The picture orientation message may be used to provide, to a video decoder, instructions on recommended orientation transforms to apply to a decoded picture. In this way, the display of the decoded picture may be shown in a more appropriate orientation. A video decoder may use the quality metrics in post processing of a decoded picture, and/or may use the quality metrics to select higher quality pictures to use for inter prediction.

Figure 1:
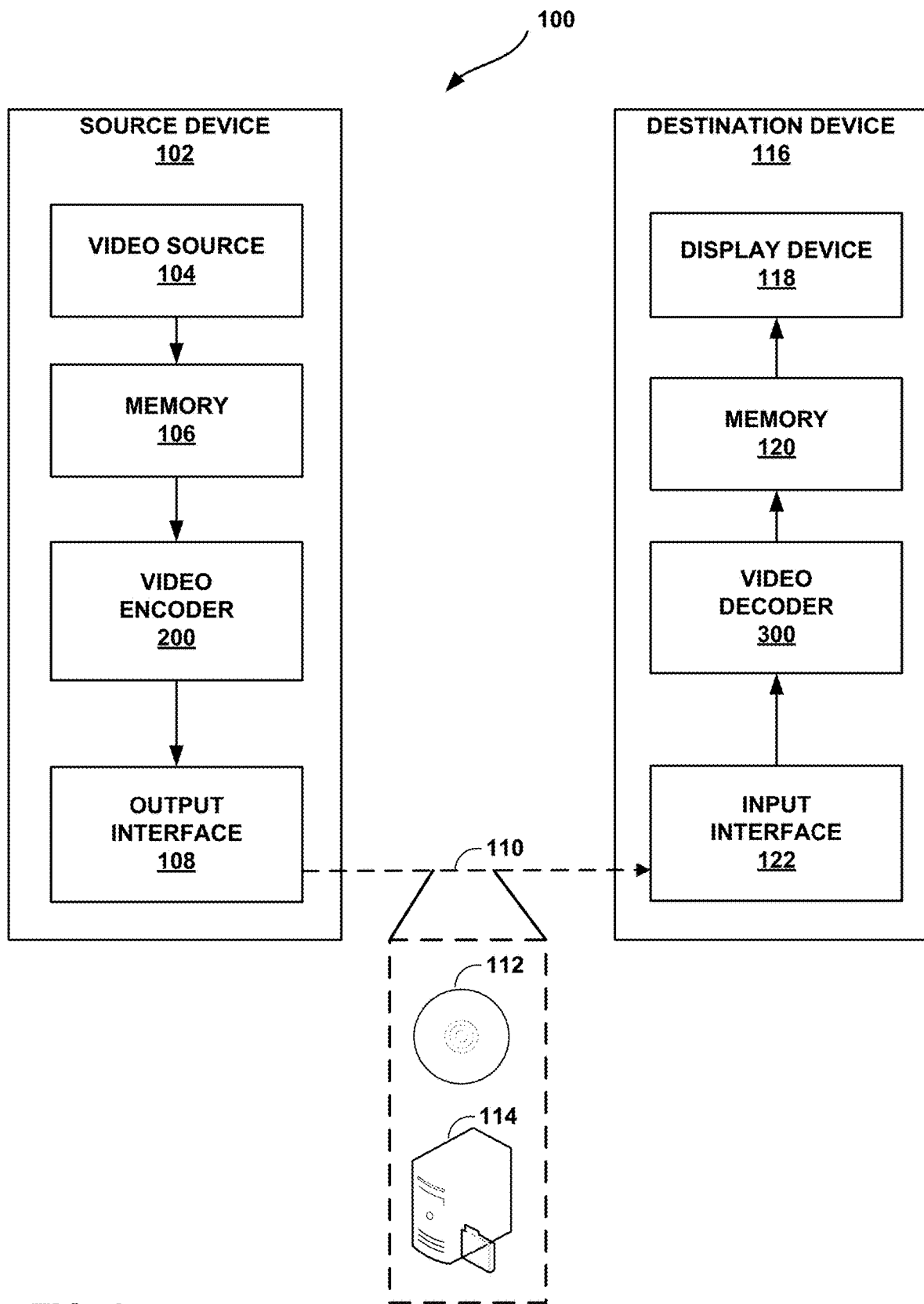
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for SEI message coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for SEI message coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use SEI messages to determine a picture orientation and/or picture quality metrics.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks.

Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or interprediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In general, this disclosure describes techniques for coding video data. In particular, this disclosure describes techniques for decoding SEI messages. The SEI messages of this disclosure may include syntax elements that indicate the orientation of a picture. In another example, the SEI messages may include syntax elements that indicate picture quality metrics. A video decoder or other device may decode the SEI messages and process pictures of video data in accordance with the SEI messages.

The versatile supplemental enhancement information (VSEI) standard (e.g., ITU-T H.274 and ISO/IEC 23002-7) specifies video usability information (VUI) messages and some of the SEI messages used with the VVC bitstream. SEI messages enable video encoder 200 to include metadata in the bitstream that is not required for the correct decoding of the sample values of the output pictures, but can be used for various other purposes. Video encoder 200 may be configured to include any number of SEI network abstraction layer (NAL) units in an access unit, and each SEI NAL unit may include one or more SEI messages. Specifications and systems using VVC may specify encoders to generate certain SEI messages or may define specific handling of particular types of received SEI messages.

ISO/IEC JTC 1/SC 29/WG 11 N 18277, "Information technology—High efficiency coding and media delivery in heterogeneous environments—Part 2: High Efficiency Video Coding," 2019 ("HEVC") specifies display orientation SEI message to inform the decoder (e.g., video decoder 300) of a transformation that is recommended to be applied to the cropped decoded picture prior to display. The syntax structure of the display orientation SEI message of HEVC is shown in Table 1 below.

TABLE 1

Display orientation SEI message syntax

| | Descriptor |
|---|---|
| display_orientation( payloadSize ) { | |
|   display_orientation_cancel_flag | u(1) |
|   if( !display_orientation_cancel_flag ) { | |
|     hor_flip | u(1) |
|     ver_flip | u(1) |
|     anticlockwise_rotation | u(16) |
|     display_orientation_persistence_flag | u(1) |
|   } | |
| } | |

As can be seen in Table 1, the display orientation SEI message of HEVC allows for the indications of a horizontal flip (hor_flip), vertical flip (ver_flip), and anticlockwise rotation (anticlockwise_rotation) transformations.

3GPP specifies a coordination of video orientation (CVO) in the technical specification (TS) 26.114, "IP Multimedia Subsystem (IMS); Multimedia telephony; Media handling and interaction," 2021. The CVO signals the current orientation of the image captured on the sender side (e.g., at source device 102) to the receiver (e.g., destination device 116) for approperiate rendering and displaying. CVO information for a lower granularity of rotation is carried as a byte formatted as follows, to support horizontal flip and 90 degree rotation:

| Bit# | 7 | 6 | 5 | 4 | 3 | 2 | 1 | 0(LSB) |
|---|---|---|---|---|---|---|---|---|
| Definition | 0 | 0 | 0 | 0 | C | F | R1 | R0 |

LSB stands for least significant bit.

CVO information for a higher granularity of rotation is carried as a byte formatted as follows:

| Bit# | 7 | 6 | 5 | 4 | 3 | 2 | 1 | 0(LSB) |
|---|---|---|---|---|---|---|---|---|
| Definition | R5 | R4 | R3 | R2 | C | F | R1 | R0 |

Figure 2:
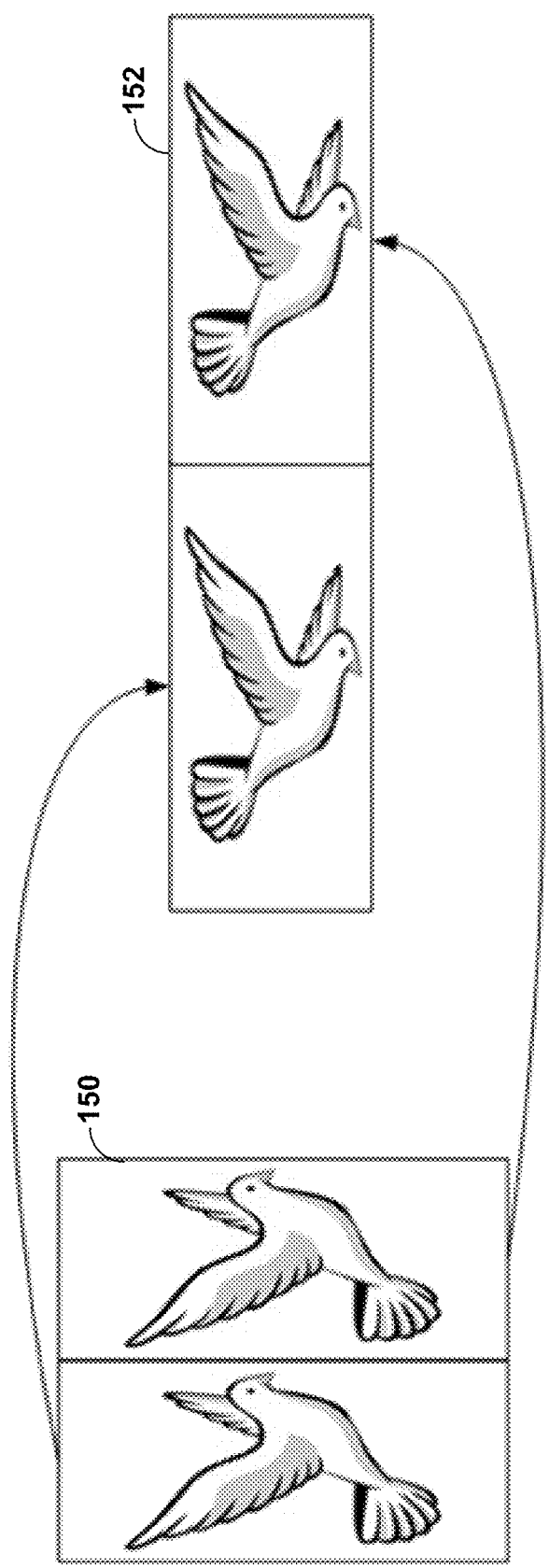
FIG. 2 is a conceptual diagram illustrating an example rotation of a picture.

Some current examples of the VSEI standard do not support any orientation metadata. The HEVC display orientation SEI message does not consider the frame-packing cases where rotation shall apply to each constituent picture instead of an entire picture. FIG. 2 shows an example of display rotation of a frame-packed picture where each constituent picture should be rotated, respectively. As shown in FIG. 2, picture 150 includes two constitutent pictures (e.g., a left view picture and a right view picture for stereoscopic video). Using the techniques of this disclosure, video encoder 200 may send code and SEI message that include a transform type sytnax element that instructs video decoder 300 to perform a rotation transform on each of the constitutent pictures to achieve transformed picture 152.

An example VSEI region-wise packing (RWP) SEI message provides information to enable remapping of the color samples of cropped decoded pictures onto projected pictures. However, the RWP SEI message is used when the omnidirectional video projection is indicated to be applied to a picture. An RWP SEI message with the rwp_cancel_flag equal to 0 shall not be present in the coded layer video sequence (CLVS) that applies to the picture.

Picture quality metrics are used to evaluate the picture quality and coding performance. ISO/IEC 23001-10, "Information technology—MPEG systems technologies—Part 10: Carriage of Timed Metadata Metrics of Media in ISO Base Media File Format," 2015, specifies the carriage of timed metadata metrics of media, such as peak signal-to-noise ratio (PSNR), structural similarly index measure (SSIM), video quality metric (VQM), and mean opinion score (MOS) in ISOBMFF (ISO/IEC base media file format). The picture quality relevant ranking is also specified in OMAF, ISO/IEC JTC1/SC29/WG11 N19042, "Text of ISO/IEC DIS 23090-2 $2^{nd}$ edition OMAF," 2020, and Immersive Media Metrics (IMM), ISO/IEC JTC1/SC29/WG3 N0073, "IS of ISO/IEC 23090-6 Immersive Media Metrics," 2020 to facilitate quality dependent viewport switching and immersive media metrics measurement. Some picture quality metrics, such as PSNR and SSIM, can only be obtained at the encoder side. An SEI message to carry such information is able to provide the relevant information to the system application.

Picture Orientation SEI Message

In accordance with one example of the disclosure, video encoder 200 is configured to generate and signal a picture orientation SEI message that includes one or more syntax elements shown in Table 2 below. In particular, video encoder 200 may be configured to generate and encode a transform type syntax element (e.g., por_transform_type), wherein the transform type syntax element indicates a transform, from among a plurality of transforms, to be applied to a picture. Video encoder 200 may also be configured to generate and encode one or more of the other syntax elements and flags listed in Table 2. Video decoder 300 may be configured to receive the picture orientation SEI message and may process and/or display pictures in accordance with the syntax elements contained therein. For example, video decoder 300 may be configured to apply the transform indicated by the transform type sytnax element to a decoded picture.

TABLE 2

Picture orientation SEI message syntax

| | Descriptor |
|---|---|
| picture_orientation( payloadSize ) { | |
|   por_cancel_flag | u(1) |
|   if( !por_cancel_flag ) { | |
|     por_persistence_flag | u(1) |
|     por_constituent_picture_matching_flag | u(1) |
|     por_transform_type | u(5) |
|   } | |
| } | |

In general, the picture orientation (POR) SEI message provides information to inform video decoder 300 of a transform that is recommended to be applied to a decoded picture prior to display. In some examples, the decoded picture may be a cropped picture.

The value of syntax element por_cancel_flag equal to 1 indicates that the current SEI message cancels the persistence of any previous POR SEI message in output order. The value of syntax element por_cancel_flag equal to 0 indicates that POR information follows.

The value of syntax element por_persistence_flag specifies the persistence of the POR SEI message for the current layer.

The value of syntax element por_persistence_flag equal to 0 specifies that the POR SEI message applies to the current decoded picture only.

The value of syntax element por_persistence_flag equal to 1 specifies that the POR SEI message applies to the current decoded picture and persists for all subsequent pictures of the current layer in output order until one or more of the following conditions are true:

A new CLVS of the current layer begins.
The bitstream ends.
A picture in the current layer in an access unit (AU) associated with a POR SEI message is output that follows the current picture in output order.

The value of syntax element por_constituent_picture_matching_flag equal to 1 specifies that the this SEI message applies individually to each constituent picture and the stereoscopic frame packing format is indicated by the frame packing arrangement SEI message. The value of syntax element por_constituent_picture_matching_flag equal to 0 specifies that this SEI message applies to the cropped decoded picture.

When either of the following conditions is true, the value of syntax element por_constituent_picture_matching_flag shall be equal to 0:

StereoFlag is equal to 0.
StereoFlag is equal to 1 and fp_arrangement_type is equal to 5.

The value of StereoFlag equal to 0 indicates the a frame packing arrangement SEI message with fp_arrangement_cancel_flag equal to 0 that applies to the picture is not present. The value of StereoFlag equal to 1 indicates the associated picture is a frame packing picture.

The value of syntax element fp_arrangement_type equal to 5 indicates the component planes of the output cropped decoded pictures in output order form a temporal interleaving of alternating first and second constituent frames.

The value of syntax element por_transform_type specifies a transform (e.g., a rotation, mirroring, or a combination of rotation and mirroring) that may be applied to a picture. Note that in some examples, mirroring may be referred to as flipping. When the transform indicated by por_transform_type specifies both rotation and mirroring, video decoder 300 may be configured to apply the rotation transform before applying mirroring, or vice versa. Example values of por_transform_type are specified in Table 3 below. In one example, the values of por_transform_type from 8 to 31 are reserved for future use by ITU-T|ISO/IEC.

TABLE 3 por_transform_type values

| Value | Description |
|---|---|
| 0 | no transform |
| 1 | mirroring horizontally |
| 2 | rotation by 180 degrees (anticlockwise) |
| 3 | rotation by 180 degrees (anticlockwise) before mirroring horizontally |
| 4 | rotation by 90 degrees (anticlockwise) before mirroring horizontally |
| 5 | rotation by 90 degrees (anticlockwise) |
| 6 | rotation by 270 degrees (anticlockwise) before mirroring horizontally |
| 7 | rotation by 270 degrees (anticlockwise) |
| 8 . . . 31 | reserved |

The specific values of Table 3 are just one example. In other examples, more or fewer transform types may be specified. Also, the transforms may be specified in different orders than that shown in Table 3.

Figure 3:
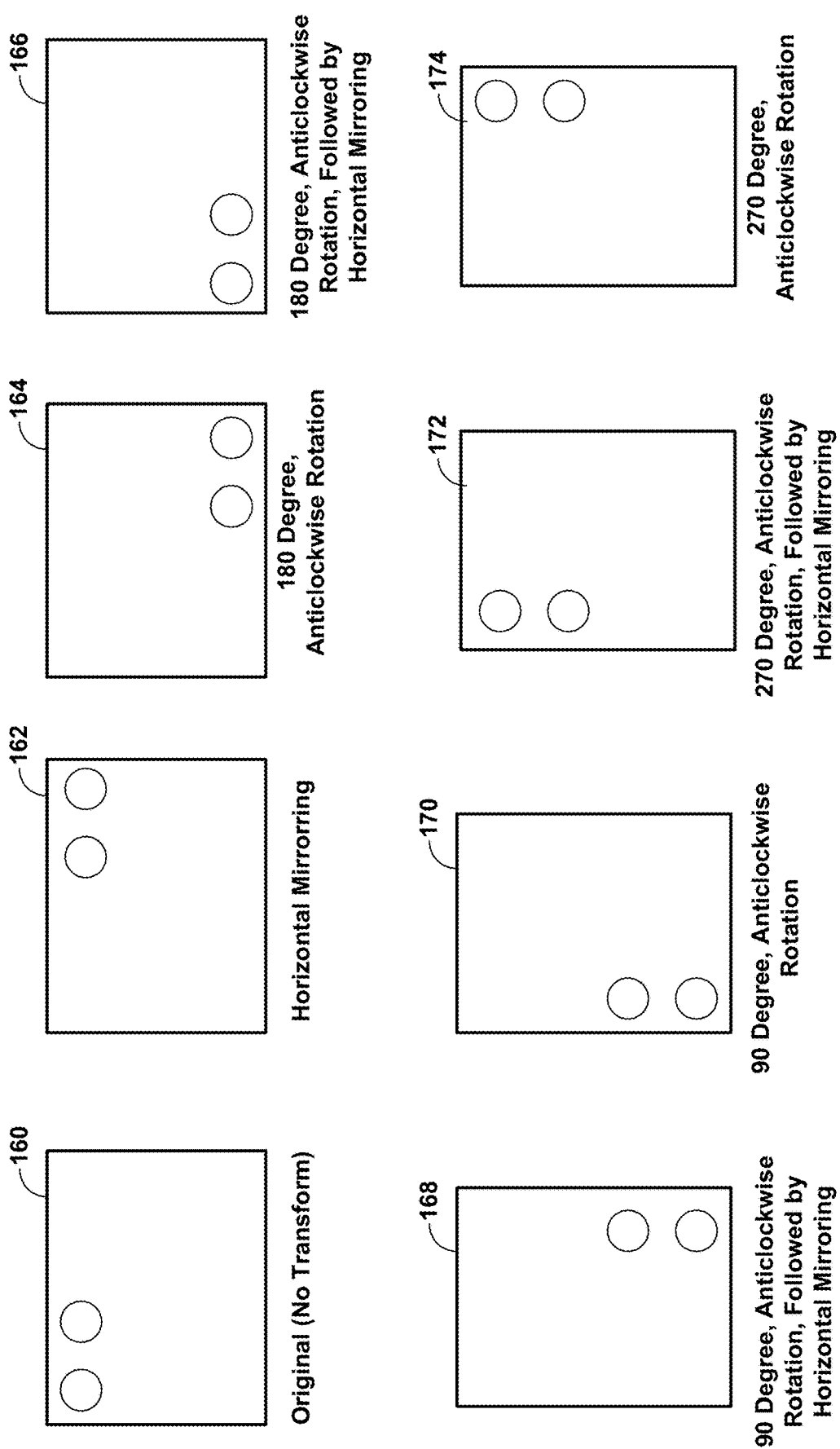
FIG. 3 is conceptual diagram illustrating example transform types.

FIG. 3 is conceptual diagram illustrating example transform types. In the example of Table 3, when the transform syntax element has a value of 0, video decoder 300 may apply no transform. FIG. 3, shows original picture 160 for which no transform is applied. The other transform types in FIG. 3 will be shown with reference to original picture 160. When the transform syntax element has a value of 1, video decoder 300 may apply a horizontal mirroring transform to original picture 160 to obtain picture 162. Horizontal mirroring may also be referred to as horizontal flipping. When the transform syntax element has a value of 2, video decoder 300 may apply a 180 degree, anticlockwise rotation transform to original picture 160 to obtain picture 164. When the transform syntax element has a value of 3, video decoder 300 may apply a 180 degree, anticlockwise rotation transform, followed by a horizontal mirroring transform, to original picture 160 to obtain picture 166.

When the transform syntax element has a value of 4, video decoder 300 may apply a 90 degree, anticlockwise rotation transform, followed by a horizontal mirroring transform, to original picture 160 to obtain picture 168. When the transform syntax element has a value of 5, video decoder 300 may apply a 90 degree, anticlockwise rotation transform to original picture 160 to obtain picture 170. When the transform syntax element has a value of 6, video decoder 300 may apply a 270 degree, anticlockwise rotation transform, followed by a horizontal mirroring transform, to original picture 160 to obtain picture 172. When the transform syntax element has a value of 7, video decoder 300 may apply a 270 degree, anticlockwise rotation transform to original picture 160 to obtain picture 174.

Figure 4:
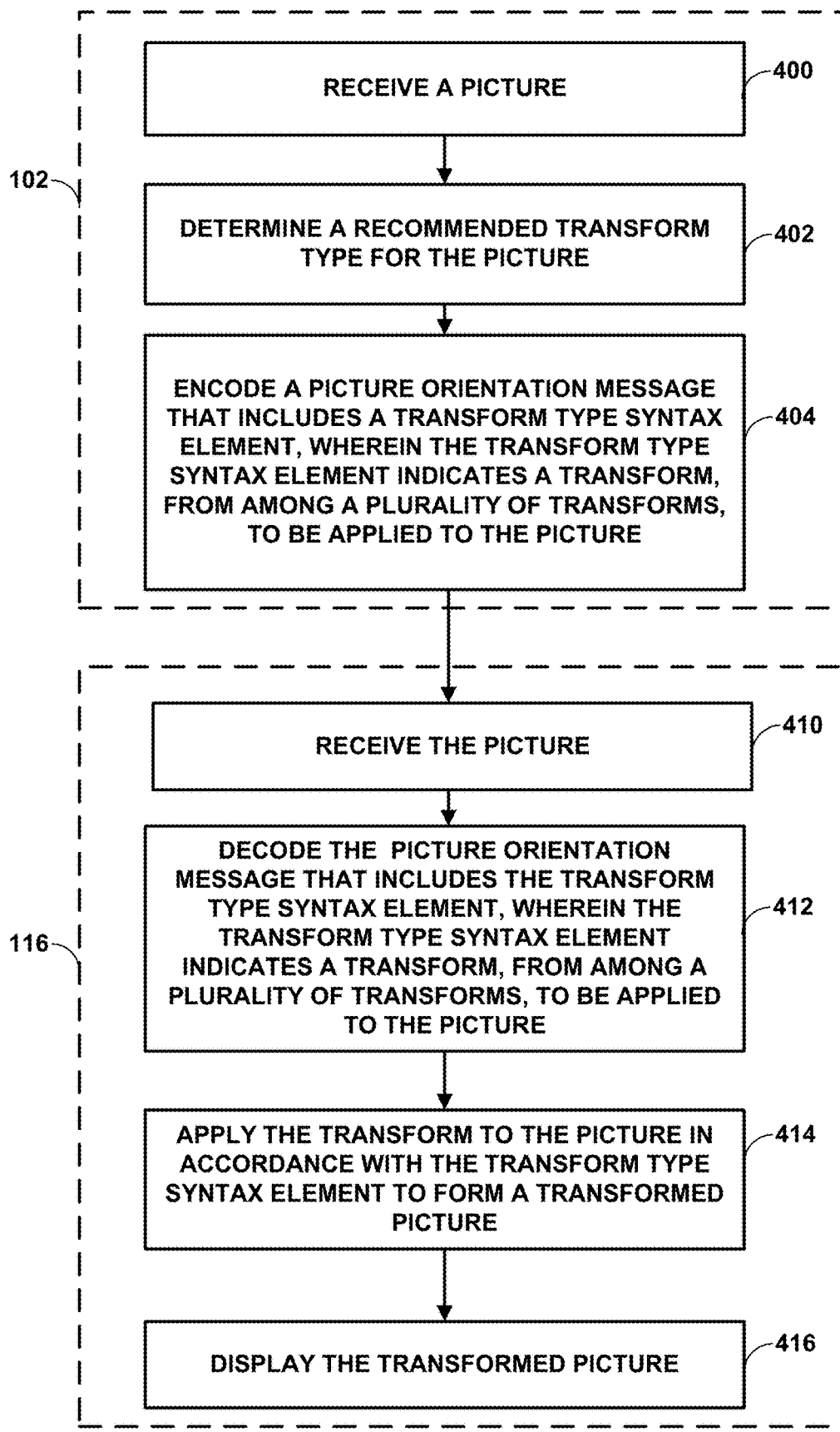
FIG. 4 is a flowchart illustrating an example process for coding picture orientation supplemental enhancement information messages.

FIG. 4 is a flowchart illustrating an example process for coding picture orientation supplemental enhancement information messages. FIG. 4 shows both encoding and decoding processes of the disclosure. As shown in FIG. 4, the encoding processes may be performed by source device 102, including video encoder 200. The decoding processes may be performed by destination device 116, including video decoder 300.

In one example of the disclosure, source device 102 may be configured to receive a picture (400). Source device 102 may further be configured to encode the picture (e.g., using video encoder 200) and transmit an encoded video bitstream to destination device 116. Source device 102 may further be configured to determine a recommend transform type of the picture (402). The recommend transform type may be a transform type from among a plurality of transform types. Source device 102 may be further configured to encode a picture orientation message that includes a transform type syntax element, wherein the transform type syntax element indicates a transform, from among a plurality of transforms, to be applied to the picture (404).

Destination device 116 may be configured to receive the picture (410). Destination device 116 may further be configured to decode the picture (e.g., using video decoder 300). Destination device 116 may also decode the picture orientation message that includes the transform type syntax element, wherein the transform type syntax element indicates a transform, from among a plurality of transforms, to be applied to the picture (412). Destination device 116 may be further configured to apply the transform to the picture in accordance with the transform type syntax element to form a transformed picture (414), and display the transformed picture (416).

In one example of the disclosure, the picture orientation message comprises a picture orientation SEI message. In another example, the picture orientation message comprises a picture orientation open bitstream unit (OBU).

As described above, the plurality of transforms includes two or more of a rotation transform, a mirroring transform, or a combination of a rotation and mirroring transform. In a more specific example, the plurality of transforms includes a first transform comprising a horizontal mirroring transform, a second transform comprising a 180 degree anticlockwise rotation transform, a third transform comprising the 180 degree anticlockwise transform followed by the horizontal mirroring transform, a fourth transform comprising a 90 degree anticlockwise transform followed by the horizontal mirroring transform, a fifth transform comprising the 90 degree anticlockwise transform, a sixth transform comprising a 270 degree anticlockwise transform followed by the horizontal mirroring transform, and a seventh transform comprising the 270 degree anticlockwise transform. In a further example, the transform type syntax element further includes a value that indicates no transform is to be applied.

In some examples, video encoder 200 may signal a high granularity of rotation in the SEI message. The high granularity of rotation and mirroring may apply to each constituent picture. In general, a high granularity of rotation my indicate degrees of rotation at relatively small intervals. For example, a high granularity of rotation may include rotating pictures at less than 90 degree angles. In case each constituent picture may rotate differently, video encoder 200 may specify separate orientation transform types or a high granularity of rotation in the SEI message or other metadata type, each applying to one constituent picture.

In some examples, video encoder 200 may specify a constituent picture matching flag in CVO signaling. The constituent picture matching flag may indicate the granularity of rotation that applies to each constituent picture.

Picture Quality Metrics SEI Message

In accordance with another example of the disclosure, video encoder 200 is configured to generate and signal a picture quality metrics message (e.g., an SEI message and/or other packetized structures) that includes one or more of the syntax element shown in Table 4 below. Video decoder 300 is configured to receive the picture quality metrics SEI message and may process and/or display pictures in accordance with the syntax elements contained therein. For example, destination device 116 and/or video decoder 300 may be configured to apply one or more post-processing techniques to a decoded picture in accordance with the quality metrics indicated in the picture quality metrics SEI message. An example post-processing technique may include upscaling a decoded picture based on the picture quality. In other examples, video decoder 300 may be configured to use the quality metrics to select certain pictures to use for inter-prediction. For example, when multiple versions of the same picture are available, video decoder 300 may be configured to select the picture with the highest quality metrics (e.g., lowest signal-to-noise ratio) to use as a reference picture in inter-prediction.

Table 4 is one example picture quality metrics SEI message. The picture quality metrics SEI message provides a quality metric for each color component of a current decoded picture.

TABLE 4

Picture quality metrics SEI message syntax

|  | Descriptor |
|---|---|
| Picture_quality_metrics( payloadSize ) { |  |
|   pqm_metric_type | u(7) |
|   pqm_single_component_flag | u(1) |
|   for( cIdx = 0; cIdx < ( dph_sei_single_ component_flag ? 1 : 3 ); cIdx++ ){ |  |
|     if( pqm_sei_type == 0 ) |  |
|       pqm_psnr[ cIdx ] | u(16) |
|     else if ( pqm_sei_type == 1 ) |  |
|       pqm_ssim[ cIdx ] | u(8) |
|     else if ( pqm_sei_type == 2 ) |  |
|       pqm_msssim[ cIdx ] | u(8) |
|     else if ( pqm_sei_type == 3 ) |  |
|       pqm_vqm[ cIdx ] | u(8) |
|   } |  |
| } |  |

The value of syntax element pqm_metric_type indicates the type of quality metric associated with the component as specified in Table 5. The values of pqm_metric_type from 4 to 127 are reserved for future use by ITU-T|ISO/IEC and shall not be present in payload data conforming to this version of this Specification.

TABLE 5

Interpretation of pqm_metric_type

| pqm_metric_type | metric |
|---|---|
| 0 | PSNR |
| 1 | SSIM |
| 2 | MS-SSIM |
| 3 | VQM |

The PSNR quality metric type is peak signal-to-noise ratio. The SSIM quality metric type is a structural similarity index. The MS-SSIM quality metric is a multiscale structural similarity index. The VQM quality metric type is a video quality metric.

The value of syntax element pqm_single_component_flag equal to 1 specifies that the picture associated with the picture quality metrics SEI message contains a single color component. The value of syntax element pqm_single_component_flag equal to 0 specifies that the picture associated with the picture quality metrics SEI message contains three color components. The value of pqm_single_component_flag shall be equal to (ChromaFormatIdc==0).

The value of syntax element pqm_psnr[cIdx] specifies the value of the PSNR. The corresponding PSNR of the color component cIdx of the decoded picture is derived as follows (expressed in floating point):

PSNR=pqm_psnr[cIdx]/100; with the exception of
PSNR=infinity for pqm_psnr[cIdx] is equal to 0

The value of syntax element pqm_ssim[cIdx] specifies the value of the SSIM. The corresponding SSIM of the color component cIdx of the decoded picture is derived as follows (expressed in floating point):

SSIM=(pqm_ssim[cIdx]−127)/128

The value of syntax element pqm_msssim[cIdx] specifies the value of the MS-SSIM. The corresponding MS-SSIM of the color component cIdx of the decoded picture is derived as follows (expressed in floating point):

MS SSIM=(pqm_msssim[cIdx]−127)/128

The value of syntax element pqm_vqm[cIdx] specifies the value of the VQM. The corresponding VQM of the color component cIdx of the decoded picture is derived as follows (expressed in floating point):

VQM=pqm_vqm[cIdx]/50

The picture quality metrics SEI message may carry other quality relevant metrics such as perceptual evaluation of video quality (PEVQ), mean opinion score (MOS), and/or other picture quality metrics.

In some examples, the picture quality metrics SEI message may specify quality metrics for each constituent picture when the picture is associated with the stereoscopic frame-packing arrangement SEI message. The picture quality metrics SEI message may specify quality metrics for each region when the picture is associated with the region-wise frame packing SEI message. Additional syntax elements may be added to the SEI message to indicate if picture quality metrics are present for each constituent picture or each region.

In other examples, the picture quality metrics SEI message may carry quality metrics of one or multiple subpictures or regions of interest (ROIs) of the picture associated with the SEI message. Syntax elements indicating the number of subpictures or ROIs, syntax elements indicating the subpictures or ROIs positions, and/or syntax element indicating the subpictures or ROIs sizes may also be specified in the SEI message.

Additional quality metrics, such as weighted PSNR (wPSNR) and weighted-to-spherically uniform PSNR (WS-PSNR), may be included in the SEI message to indicate the quality of high dynamic range (HDR) and 360 video content.

Another example picture metrics SEI message format is provided in Table 6:

TABLE 6

Picture quality metric SEI message syntax

| | Descriptor |
|---|---|
| Picture_quality_metrics( payloadSize ) { | |
|   pqm_cnt_minus1 | u(8) |
|   for( i = 0; i <= pqm_cnt_minus1; i++ ) { | |
|     pqm_type[ i ] | u(8) |
|     pqm_value[ i ] | u(16) |
|   } | |
| } | |

The picture metrics SEI message above provides quality metrics of the current decoded picture.

The value of syntax element pqm_cnt_minus1 plus 1 specifies the number of luma component quality metrics that are indicated by the SEI message.

The value of syntax element pqm_type[i] indicates the i-th quality metric type associated with the decoded picture or video sequence as specified in Table 7.

TABLE 7

Interpretation of pqm_type

| pqm_type | metric |
|---|---|
| 0 | PSNR |
| 1 | wPSNR |
| 2 | WS-PSNR |
| 3 | $PSNR_{sequence}$ |
| 4 | $wPSNR_{sequence}$ |
| 5 | $WS\text{-}PSNR_{sequence}$ |

The $PSNR_{sequence}$, $wPSNR_{sequence}$, and $WS\text{-}PSNR_{sequence}$ quality metric types indicate the PSNR, wPSNR, and WS-PSNR of multiple pictures over sequence, respectively.

The value of syntax element pqm_value[i] specifies the value of the i-th quality metric. When the value of syntax element pqm_type is 0, then the stored 16-bit unsigned integer pqm_value is interpreted as PSNR value (in dB) as follows (expressed in floating point), with the exception of PSNR equal to infinity for pqm_value value equal to 0.

$$PSNR = \frac{pqm\_value[0]}{M};$$

where M is an integer (e.g., 100).

When the value of syntax element pqm_type is 1, then the stored 16-bit unsigned integer pqm_value is interpreted as wPSNR value (in dB) as follows (expressed in floating point), with the exception of wPSNR equal to infinity for pqm_value value equal to 0.

$$wPSNR = \frac{pqm\_value[1]}{M};$$

where M is an integer (e.g., 100)

When the value of syntax element pqm_type is 2, then the stored 16-bit unsigned integer pqm_value is interpreted as WS-PSNR value (in dB) as follows (expressed in floating point), with the exception of WS-PSNR equal to infinity for pqm_value value equal to 0.

$$WS\_PSNR = \frac{pqm\_value[2]}{M};$$

where M is an integer (e.g., 100).

When the value of syntax element pqm_type is 3, the quality metric indicates the average luma PSNR of the CLVS to which the associated picture belongs. The 16-bit unsigned integer pqm_value is interpreted as a result of a sequence-level PSNR quality metric (in dB), and derived as follows (expressed in floating point), with the exception of PSNR equal to infinity for pqm_value value is equal to 0.

$$PSNR_{sequence} = \frac{pqm\_value[3]}{M};$$

where M is an integer (e.g., 100).

When the value of syntax element pqm_type is 4, the quality metric indicates the average luma weighted PSNR of the CLVS to which the associated picture belongs. The 16-bit unsigned integer pqm_value is interpreted as a sequence-level wPSNR value (in dB) as follows (expressed in floating point), with the exception of wPSNR equal to infinity for pqm_value value is equal to 0.

$$wPSNR_{sequence} = \frac{pqm\_value[4]}{M};$$

where M is an integer (e.g., 100).

When the value of syntax element pqm_type is 5, the quality metric indicates the average luma WS-PSNR of the CLVS to which the associated picture belongs. The 16-bit unsigned integer pqm_value is interpreted as a sequence-level WS-PSNR value (in dB) as follows (expressed in floating point), with the exception of WS-PSNR equal to infinity for pqm_value value is equal to 0.

$$WS\_PSNR_{sequence} = \frac{pqm\_value[5]}{M};$$

where M is an integer (e.g., 100).

In another example, additional quality metrics types may be included in the SEI message to indicate the average quality metrics that apply to multiple video frames. A first syntax element may be specified in the SEI message to indicate that the quality metric specified in the SEI message applies to the associated picture and persists for all subsequent pictures of the current layer in output order. A second syntax element may be specified in the SEI message to cancel the persistence of any previous quality metrics in the output order.

In another example, when an average quality metric, such as a sequence level PSNR, is present for any picture of a CLVS, the associated picture quality SEI message shall be present for the first picture of the CLVS. The average picture metric of all SEI messages that apply to the same CLVS shall have the same content.

Figure 5:
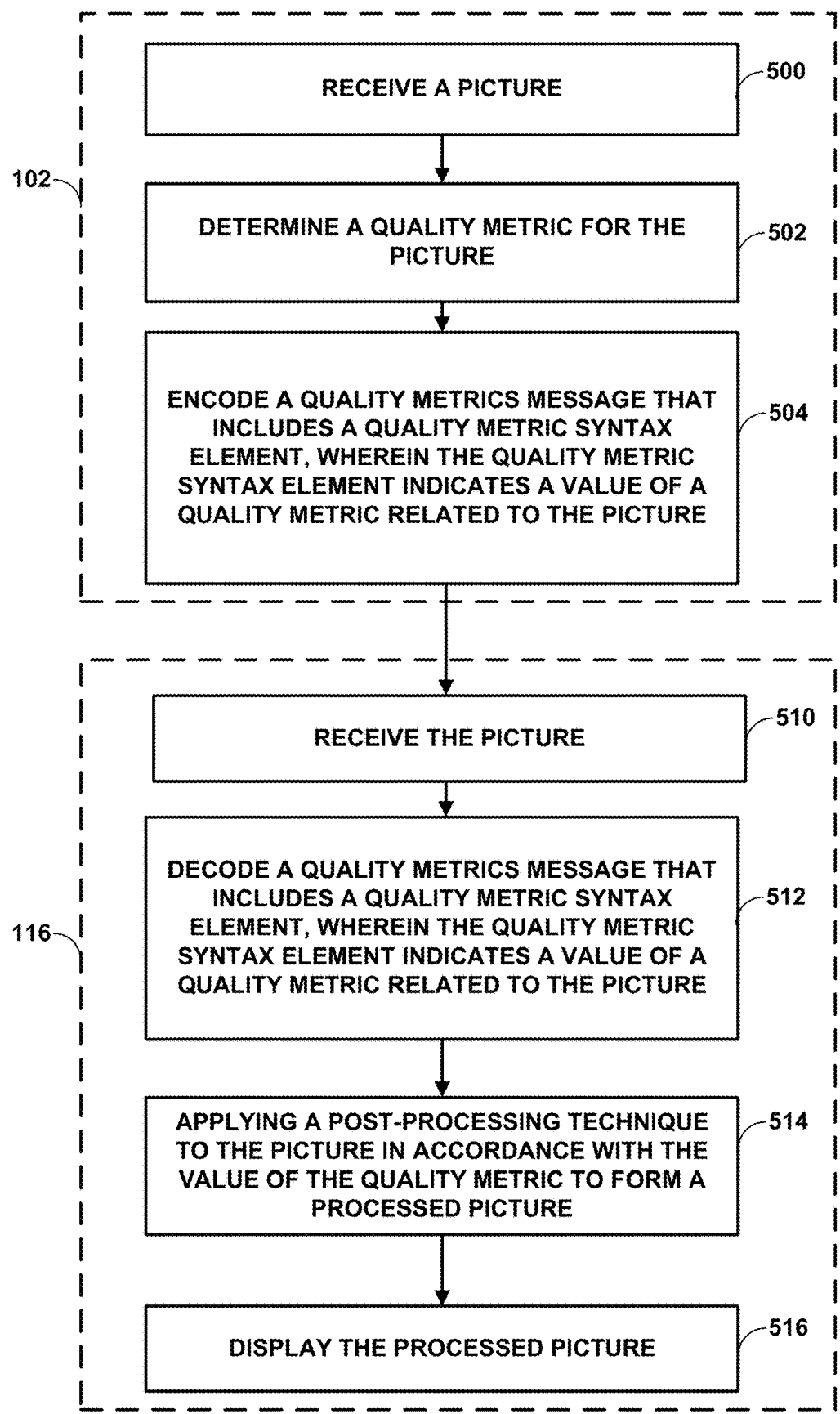
FIG. 5 is a flowchart illustrating an example process for coding quality metrics supplemental enhancement information messages.

FIG. 5 is a flowchart illustrating an example process for coding quality metrics supplemental enhancement information messages. FIG. 5 shows both encoding and decoding processes of the disclosure. As shown in FIG. 5, the encoding processes may be performed by source device 102, including video encoder 200. The decoding processes may be performed by destination device 116, including video decoder 300.

In one example of the disclosure, source device 102 may be configured to receive a picture (500). Source device 102 may further be configured to encode the picture (e.g., using video encoder 200) and transmit an encoded video bitstream to destination device 116. Source device 102 may further be configured to determine a quality metric for picture (502). Source device 102 may be further configured to encode a quality metrics message that includes a quality metric syntax element, wherein the quality metric syntax element indicates a value of a quality metric related to the picture (504).

In a further example of the disclosure, source device 102 may be further configured to encode a quality metric type syntax element in the quality metrics message, wherein the quality metric type syntax element indicates a type of quality metric, from among a plurality of types of quality metrics, indicated by the quality metric syntax element. In one example, the plurality of types of quality metrics includes a peak signal-to-noise ratio (PSNR). In another example, the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR. In the above examples, the quality metric syntax element indicates the value of the quality metric indicated by the quality metric type syntax element.

Destination device 116 may be configured to receive the picture (510). Destination device 116 may further be configured to decode the picture (e.g., using video decoder 300). Destination device 116 may also decode the quality metrics message that includes the quality metric syntax element, wherein the quality metric syntax element indicates the value of the quality metric related to the picture (512). Destination device 116 may be further configured to apply a post-processing technique to the picture in accordance with the value of the quality metric to form a processed picture (514), and display the processed picture (516).

In a further example of the disclosure, destination device 116 may be further configured to decode a quality metric type syntax element in the quality metrics message, wherein the quality metric type syntax element indicates a type of quality metric, from among a plurality of types of quality metrics, indicated by the quality metric syntax element. In one example, the plurality of types of quality metrics includes a peak signal-to-noise ratio (PSNR). In another example, the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR. In the above examples, the quality metric syntax element indicates the value of the quality metric indicated by the quality metric type syntax element.

In one example of the disclosure, the quality metrics message comprises a quality metrics SEI message. In another example, the quality metrics message comprises a quality metrics open bitstream unit (OBU).

In other examples of the disclosure, source device 102 and/or destination device 116 may be configured to code a second quality metrics message that includes a second quality metric syntax element, wherein the second quality metric syntax element indicates a second value of a second quality metric related to a subpicture or region-of-interest of the picture.

For purposes of explanation, the above techniques are described in the context of VVC (ITU-T H.266, under development), and HEVC (ITU-T H.265). However, the techniques of this disclosure may be performed by video encoding devices that are configured to other video coding standards and video coding formats, such as AV1, future versions of AV1, and successors to the AV1 video coding format. For instance, as opposed to being SEI messages, the messages may be packetized data such as open bitstream units (OBUs) that include at least some of the metadata described in the present disclosure. As one example, some or all of the above-described syntax included within the picture orientation SEI message may be included within a picture orientation OBU such that the picture orientation OBU includes one or more of a cancel flag, a persistence flag, a constituent picture matching flag, or a transform type syntax element. As another example, some or all of the above-described syntax included within the picture quality metrics SEI message may be included within a picture quality metrics OBU such that the picture quality metrics OBU includes one or more syntax elements indicative of a quality metric of the picture.

Figure 6:
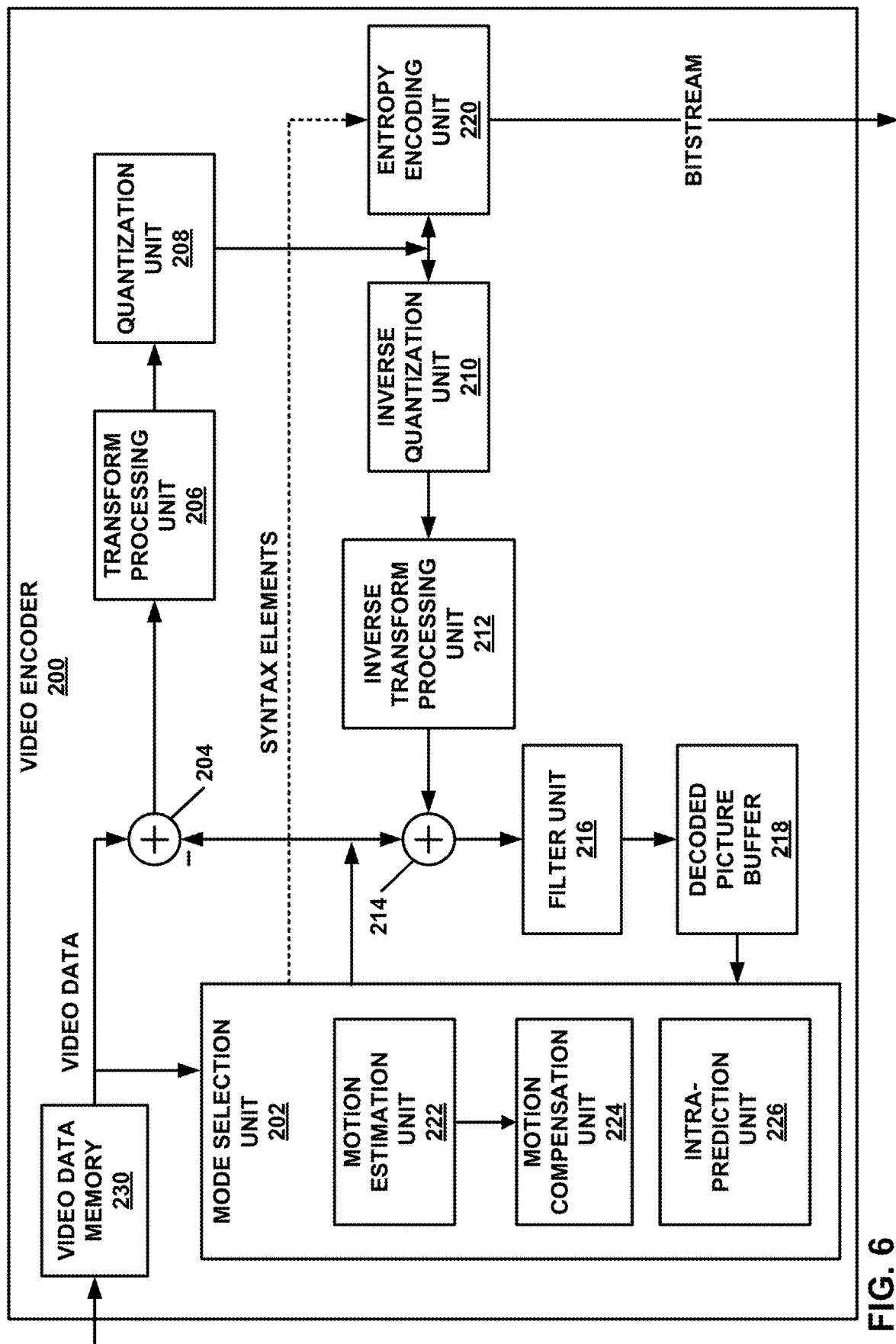
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In accordance with the SEI techniques discussed above, video encoder 200 represents an example of a device configured to encode video data including a memory configured to store video data, and one or more processing units implemented in circuitry and configured to receive a picture, and encode a picture orientation message that includes a transform type syntax element, wherein the transform type syntax element indicates a transform, from among a plurality of transforms, to be applied to the picture. Video encoder 200 may further be configured to encode a quality metrics message that includes a quality metric syntax element, wherein the quality metric syntax element indicates a value of a quality metric related to the picture.

Figure 7:
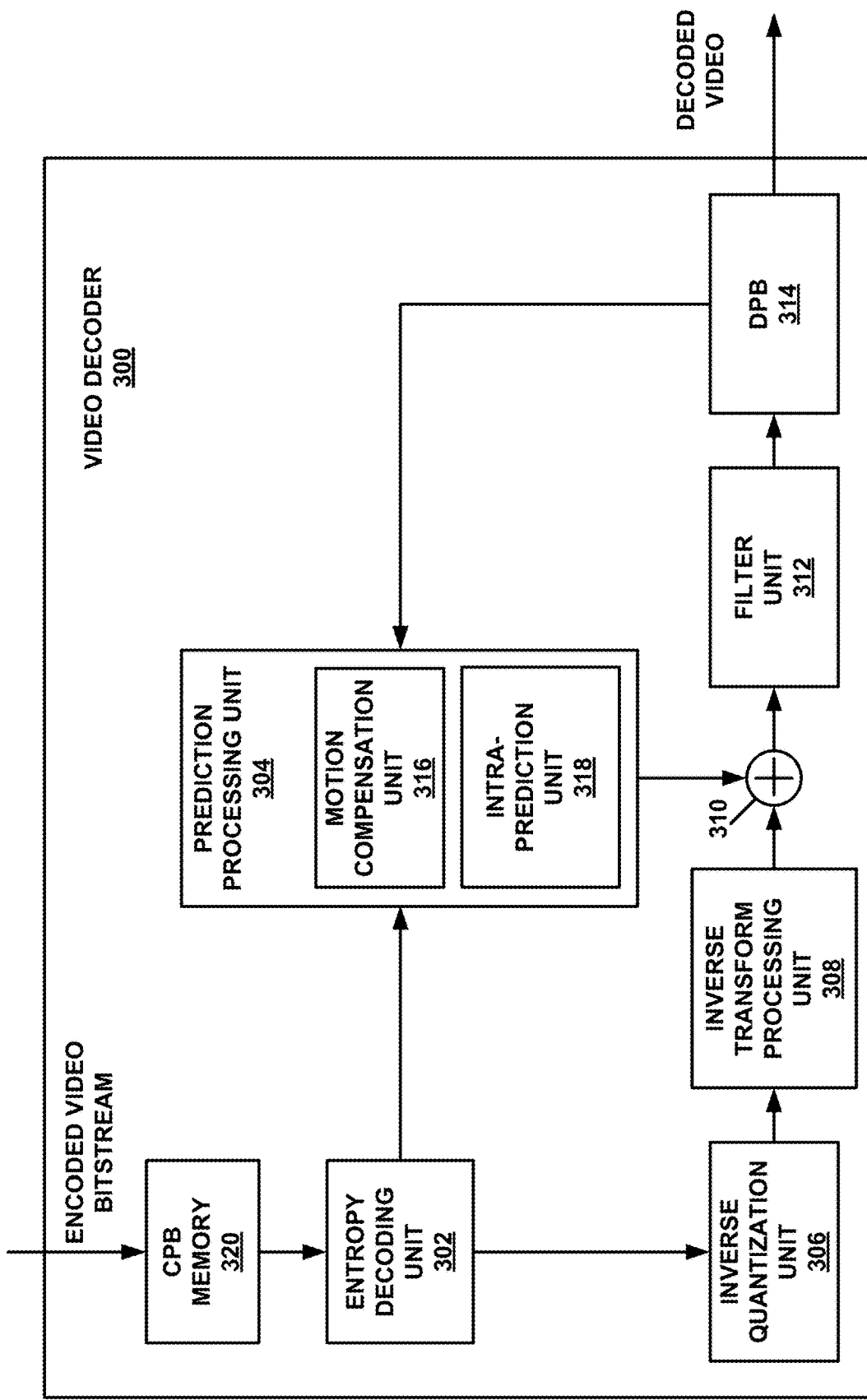
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In accordance with the SEI techniques discussed above, video decoder 300 represents an example of a device configured to decode video data including a memory configured to store video data, and one or more processing units implemented in circuitry and configured to receive a picture, and decode a picture orientation message that includes a transform type syntax element, wherein the transform type syntax element indicates a transform, from among a plurality of transforms, to be applied to the picture. Video decoder 300 may further be configured to decode a quality metrics message that includes a quality metric syntax element, wherein the quality metric syntax element indicates a value of a quality metric related to the picture.

Figure 8:
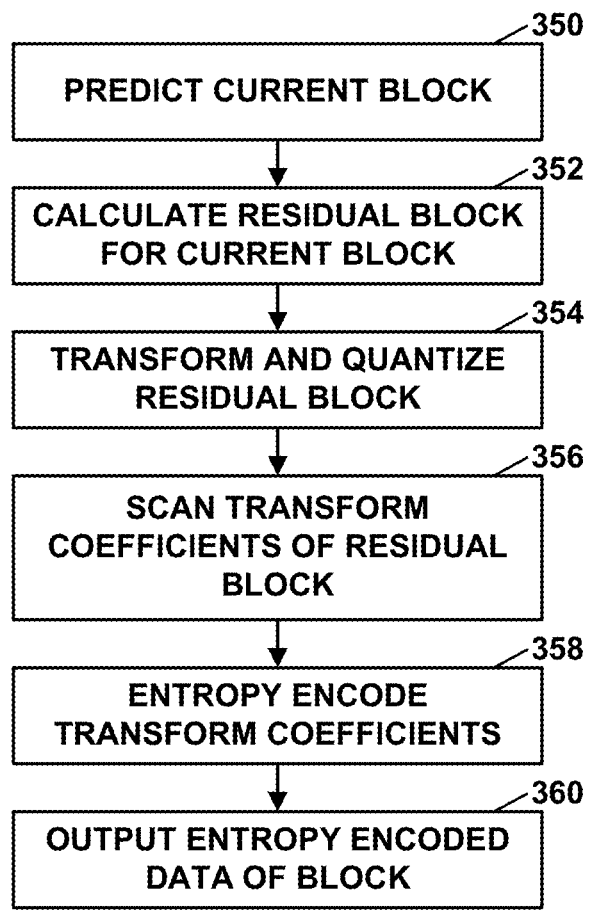
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
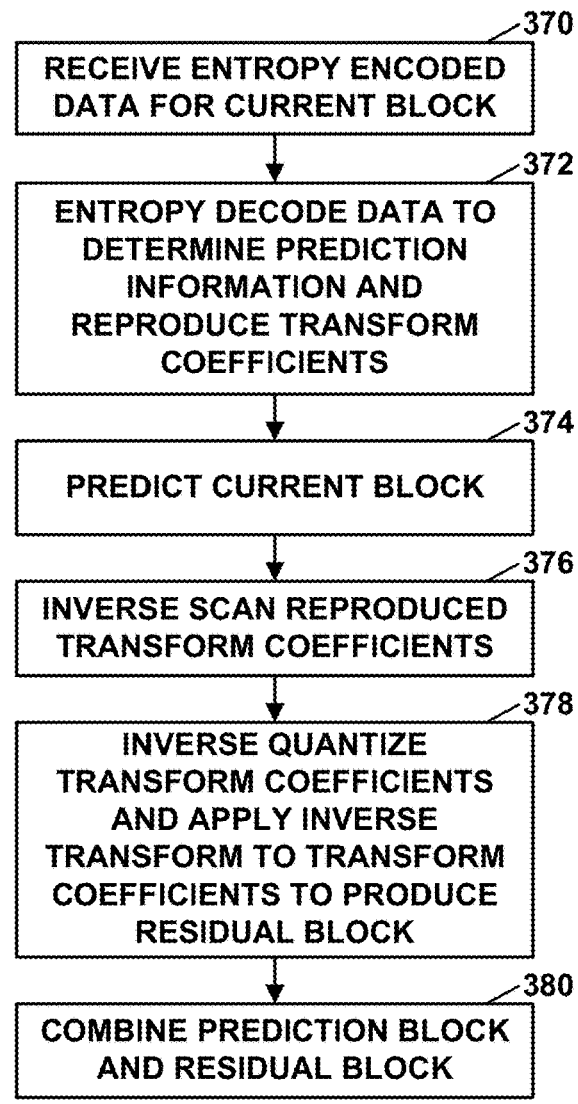
FIG. 9 is a flowchart illustrating an example method for decoding a current block in accordance with the techniques of this disclosure.

FIG. 9 is a flowchart illustrating an example method for decoding a current block of video data in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Other illustrative aspects of the techniques and devices of the disclosure are described below.

Aspect 1A—A method of processing video data, the method comprising: receiving a picture; and coding a picture orientation supplemental enhancement information (SEI) message that includes one or more of a cancel flag, a persistence flag, a constituent picture matching flag, or a transform type syntax element, wherein the transform type syntax element indicates one or more of a rotation or a mirroring to be applied to the picture.

Aspect 2A—The method of Aspect 1A, wherein coding comprises decoding, and wherein the method further comprises: processing the picture in accordance with the picture orientation SEI message.

Aspect 3A—The method of Aspect 1A or Aspect 2A, wherein the picture orientation message comprises a picture orientation supplemental enhancement information (SEI) message.

Aspect 4A—The method of Aspect 1A or Aspect 2A, wherein the picture orientation message comprises a picture orientation open bitstream unit (OBU).

Aspect 5A—The method of claim 1A, wherein coding comprises encoding.

Aspect 6A—A method of processing video data, the method comprising: receiving a picture; and coding a picture quality metrics supplemental enhancement information (SEI) message that includes one or more syntax elements indicative of a quality metric of the picture.

Aspect 7A—The method of Aspect 6A, wherein coding comprises decoding, and wherein the method further comprises: processing the picture in accordance with the picture quality metrics SEI message.

Aspect 8A—The method of Aspect 6A or Aspect 7A, wherein the picture orientation message comprises a picture quality metrics supplemental enhancement information (SEI) message.

Aspect 9A—The method of any of Aspects 6A-8A, wherein the picture quality metrics message comprises one or more syntax elements that indicate quality metrics of one or more subpictures or regions of interest of the picture associated with the picture quality metrics message.

Aspect 10A—The method of Aspect 9A, wherein the one or more syntax elements indicate quality metrics of High Dynamic Range (HDR) or 360 video content.

Aspect 11A—The method of any of Aspects 6A-10A, wherein coding comprises encoding.

Aspect 12A—Any combination of methods of Aspects 1A-10A.

Aspect 13A—A device for processing video data, the device comprising one or more means for performing the method of any of Aspects 1A-12A.

Aspect 14A—The device of Aspect 13A, wherein the one or more means comprise one or more processors implemented in circuitry.

Aspect 15A—The device of any of Aspects 13A and 14A, further comprising a memory to store the video data.

Aspect 16A—The device of any of Aspects 13A-15A, further comprising a display configured to display decoded video data.

Aspect 17A—The device of any of Aspects 13A-16A, wherein the device comprises one or more of a camera, a computer, a mobile device, a broadcast receiver device, or a set-top box.

Aspect 18A—The device of any of Aspects 13A-17A, wherein the device comprises a video decoder.

Aspect 19A—The device of any of Aspects 13A-18A, wherein the device comprises a video encoder.

Aspect 20A—A computer-readable storage medium having stored thereon instructions that, when executed, cause one or more processors to perform the method of any of Aspects 1A-12A.

Aspect 1B—A method of processing video data, the method comprising: receiving a picture; and coding a quality metrics message that includes a quality metric syntax element, wherein the quality metric syntax element indicates a value of a quality metric related to the picture.

Aspect 2B—The method of Aspect 1B, further comprising: coding a quality metric type syntax element in the quality metrics message, wherein the quality metric type syntax element indicates a type of quality metric, from among a plurality of types of quality metrics, indicated by the quality metric syntax element.

Aspect 3B—The method of Aspect 2B, wherein the plurality of types of quality metrics includes a peak signal-to-noise ratio (PSNR).

Aspect 4B—The method of Aspect 2B, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 5B—The method of Aspect 2B, wherein the quality metric syntax element indicates the value of the quality metric indicated by the quality metric type syntax element.

Aspect 6B—The method of Aspect 1B, further comprising: coding a second quality metrics message that includes a second quality metric syntax element, wherein the second quality metric syntax element indicates a second value of a second quality metric related to a subpicture of the picture.

Aspect 7B—The method of Aspect 1B, further comprising: coding a second quality metrics message that includes a second quality metric syntax element, wherein the second quality metric syntax element indicates a second value of a second quality metric related to a region-of-interest of the picture.

Aspect 8B—The method of Aspect 1B, wherein coding comprises decoding, and wherein the method further comprises: applying a post-processing technique to the picture in accordance with the value of the quality metric to form a processed picture; and displaying the processed picture.

Aspect 9B—The method of Aspect 1B, wherein the quality metrics message comprises a quality metrics supplemental enhancement information (SEI) message.

Aspect 10B—The method of Aspect 1B, wherein the quality metrics message comprises a quality metrics open bitstream unit (OBU).

Aspect 11B—An apparatus configured to process video data, the apparatus comprising: a memory configured to store a picture; and one or more processors implemented in circuitry and in communication with the memory, the one or more processors configured to: receive the picture; and code a quality metrics message that includes a quality metric syntax element, wherein the quality metric syntax element indicates a value of a quality metric related to the picture.

Aspect 12B—The apparatus of Aspect 11B, wherein the one or more processors are further configured to: code a quality metric type syntax element in the quality metrics message, wherein the quality metric type syntax element indicates a type of quality metric, from among a plurality of types of quality metrics, indicated by the quality metric syntax element.

Aspect 13B—The apparatus of Aspect 12B, wherein the plurality of types of quality metrics includes a peak signal-to-noise ratio (PSNR).

Aspect 14B—The apparatus of Aspect 12B, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 15B—The apparatus of Aspect 12B, wherein the quality metric syntax element indicates the value of the quality metric indicated by the quality metric type syntax element.

Aspect 16B—The apparatus of Aspect 11B, wherein the one or more processors are further configured to: code a second quality metrics message that includes a second quality metric syntax element, wherein the second quality metric syntax element indicates a second value of a second quality metric related to a subpicture of the picture.

Aspect 17B—The apparatus of Aspect 11B, wherein the one or more processors are further configured to: code a second quality metrics message that includes a second quality metric syntax element, wherein the second quality metric syntax element indicates a second value of a second quality metric related to a region-of-interest of the picture.

Aspect 18B—The apparatus of Aspect 11B, wherein the apparatus is configured to decode the quality metrics message, and wherein the one or more processors are further configured to: apply a post-processing technique to the picture in accordance with the value of the quality metric to form a processed picture; and display the processed picture.

Aspect 19B—The apparatus of Aspect 11B, wherein the quality metrics message comprises a quality metrics supplemental enhancement information (SEI) message.

Aspect 20B—The apparatus of Aspect 11B, wherein the quality metrics message comprises a quality metrics open bitstream unit (OBU).

Aspect 21B—An apparatus configured to process video data, the apparatus comprising: means for receiving a picture; and means for coding a quality metrics message that includes a quality metric syntax element, wherein the quality metric syntax element indicates a value of a quality metric related to the picture.

Aspect 22B—The apparatus of Aspect 21B, further comprising: means for coding a quality metric type syntax element in the quality metrics message, wherein the quality metric type syntax element indicates a type of quality metric, from among a plurality of types of quality metrics, indicated by the quality metric syntax element.

Aspect 23B—The apparatus of Aspect 22B, wherein the plurality of types of quality metrics includes a peak signal-to-noise ratio (PSNR).

Aspect 24B—The apparatus of Aspect 22B, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 25B—The apparatus of Aspect 22B, wherein the quality metric syntax element indicates the value of the quality metric indicated by the quality metric type syntax element.

Aspect 26B—The apparatus of Aspect 21B, further comprising: means for coding a second quality metrics message that includes a second quality metric syntax element, wherein the second quality metric syntax element indicates a second value of a second quality metric related to a subpicture of the picture.

Aspect 27B—The apparatus of Aspect 21B, further comprising: means for coding a second quality metrics message that includes a second quality metric syntax element, wherein the second quality metric syntax element indicates a second value of a second quality metric related to a region-of-interest of the picture.

Aspect 28B—The apparatus of Aspect 21B, wherein the means for coding comprises means for decoding, and wherein the apparatus further comprises: means for applying a post-processing technique to the picture in accordance with the value of the quality metric to form a processed picture; and means for displaying the processed picture.

Aspect 29B—The apparatus of Aspect 21B, wherein the quality metrics message comprises a quality metrics supplemental enhancement information (SEI) message.

Aspect 30B—The apparatus of Aspect 21B, wherein the quality metrics message comprises a quality metrics open bitstream unit (OBU).

Aspect 31B—A non-transitory computer-readable storage medium storing instructions that, when executed, cause one or more processors of a device configured to process video data to: receive a picture; and code a quality metrics message that includes a quality metric syntax element, wherein the quality metric syntax element indicates a value of a quality metric related to the picture.

Aspect 32B—The non-transitory computer-readable storage medium of Aspect 31B, wherein the instructions further cause the one or more processors to: code a quality metric type syntax element in the quality metrics message, wherein the quality metric type syntax element indicates a type of quality metric, from among a plurality of types of quality metrics, indicated by the quality metric syntax element.

Aspect 33B—The non-transitory computer-readable storage medium of Aspect 32B, wherein the plurality of types of quality metrics includes a peak signal-to-noise ratio (PSNR).

Aspect 34B—The non-transitory computer-readable storage medium of Aspect 32, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 35B—The non-transitory computer-readable storage medium of Aspect 32B, wherein the quality metric syntax element indicates the value of the quality metric indicated by the quality metric type syntax element.

Aspect 36B—The non-transitory computer-readable storage medium of Aspect 31B, wherein the instructions further cause the one or more processors to: code a second quality metrics message that includes a second quality metric syntax element, wherein the second quality metric syntax element indicates a second value of a second quality metric related to a subpicture of the picture.

Aspect 37B—The non-transitory computer-readable storage medium of Aspect 31B, wherein the instructions further cause the one or more processors to: code a second quality metrics message that includes a second quality metric syntax element, wherein the second quality metric syntax element indicates a second value of a second quality metric related to a region-of-interest of the picture.

Aspect 38B—The non-transitory computer-readable storage medium of Aspect 31B, wherein the device is configured to decode the quality metrics message, and wherein the instructions further cause the one or more processors to: apply a post-processing technique to the picture in accordance with the value of the quality metric to form a processed picture; and display the processed picture.

Aspect 39B—The non-transitory computer-readable storage medium of Aspect 31B, wherein the quality metrics message comprises a quality metrics supplemental enhancement information (SEI) message.

Aspect 40B—The non-transitory computer-readable storage medium of Aspect 31B, wherein the quality metrics message comprises a quality metrics open bitstream unit (OBU).

Aspect 1C—A method of processing video data, the method comprising: receiving a picture; and coding a quality metrics message that includes a quality metric syntax element, wherein the quality metric syntax element indicates a value of a quality metric related to the picture.

Aspect 2C—The method of Aspect 1C, further comprising: coding a quality metric type syntax element in the quality metrics message, wherein the quality metric type syntax element indicates a type of quality metric, from among a plurality of types of quality metrics, indicated by the quality metric syntax element.

Aspect 3C—The method of Aspect 2C, wherein the plurality of types of quality metrics includes a peak signal-to-noise ratio (PSNR).

Aspect 4C—The method of Aspect 2C, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 5C—The method of any of Aspects 2C-4C, wherein the quality metric syntax element indicates the value of the quality metric indicated by the quality metric type syntax element.

Aspect 6C—The method of any of Aspects 1C-5C, further comprising: coding a second quality metrics message that includes a second quality metric syntax element, wherein the second quality metric syntax element indicates a second value of a second quality metric related to a subpicture of the picture.

Aspect 7C—The method of any of Aspects 1C-5C, further comprising: coding a second quality metrics message that includes a second quality metric syntax element, wherein the second quality metric syntax element indicates a second value of a second quality metric related to a region-of-interest of the picture.

Aspect 8C—The method of any of Aspects 1C-7C, wherein coding comprises decoding, and wherein the method further comprises: applying a post-processing technique to the picture in accordance with the value of the quality metric to form a processed picture; and displaying the processed picture.

Aspect 9C—The method of any of Aspects 1C-8C, wherein the quality metrics message comprises a quality metrics supplemental enhancement information (SEI) message.

Aspect 10C—The method of any of Aspects 1C-8C, wherein the quality metrics message comprises a quality metrics open bitstream unit (OBU).

Aspect 11C—An apparatus configured to process video data, the apparatus comprising: a memory configured to store a picture; and one or more processors implemented in circuitry and in communication with the memory, the one or more processors configured to: receive the picture; and code a quality metrics message that includes a quality metric syntax element, wherein the quality metric syntax element indicates a value of a quality metric related to the picture.

Aspect 12C—The apparatus of Aspect 11C, wherein the one or more processors are further configured to: code a quality metric type syntax element in the quality metrics message, wherein the quality metric type syntax element indicates a type of quality metric, from among a plurality of types of quality metrics, indicated by the quality metric syntax element.

Aspect 13C—The apparatus of Aspect 12C, wherein the plurality of types of quality metrics includes a peak signal-to-noise ratio (PSNR).

Aspect 14C—The apparatus of Aspect 12C, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 15C—The apparatus of any of Aspects 12C-14C, wherein the quality metric syntax element indicates the value of the quality metric indicated by the quality metric type syntax element.

Aspect 16C—The apparatus of any of Aspects 11C-15C, wherein the one or more processors are further configured to: code a second quality metrics message that includes a second quality metric syntax element, wherein the second quality metric syntax element indicates a second value of a second quality metric related to a subpicture of the picture.

Aspect 17C—The apparatus of any of Aspects 11C-15C, wherein the one or more processors are further configured to: code a second quality metrics message that includes a second quality metric syntax element, wherein the second quality metric syntax element indicates a second value of a second quality metric related to a region-of-interest of the picture.

Aspect 18C—The apparatus of any of Aspects 11C-17C, wherein the apparatus is configured to decode the quality metrics message, and wherein the one or more processors are further configured to: apply a post-processing technique to the picture in accordance with the value of the quality metric to form a processed picture; and display the processed picture.

Aspect 19C—The apparatus of any of Aspects 11C-18C, wherein the quality metrics message comprises a quality metrics supplemental enhancement information (SEI) message.

Aspect 20C—The apparatus of any of Aspects 11C-18C, wherein the quality metrics message comprises a quality metrics open bitstream unit (OBU).

Aspect 21C—An apparatus configured to process video data, the apparatus comprising: means for receiving a picture; and means for coding a quality metrics message that includes a quality metric syntax element, wherein the quality metric syntax element indicates a value of a quality metric related to the picture.

Aspect 22C—The apparatus of Aspect 21C, further comprising: means for coding a quality metric type syntax element in the quality metrics message, wherein the quality metric type syntax element indicates a type of quality metric, from among a plurality of types of quality metrics, indicated by the quality metric syntax element.

Aspect 23C—The apparatus of Aspect 22C, wherein the plurality of types of quality metrics includes a peak signal-to-noise ratio (PSNR).

Aspect 24C—The apparatus of Aspect 22C, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 25C—The apparatus of any of Aspects 22C-24C, wherein the quality metric syntax element indicates the value of the quality metric indicated by the quality metric type syntax element.

Aspect 26C—The apparatus of any of Aspects 21C-25C, further comprising: means for coding a second quality metrics message that includes a second quality metric syntax element, wherein the second quality metric syntax element indicates a second value of a second quality metric related to a subpicture of the picture.

Aspect 27C—The apparatus of any of Aspects 21C-25C, further comprising: means for coding a second quality metrics message that includes a second quality metric syntax element, wherein the second quality metric syntax element indicates a second value of a second quality metric related to a region-of-interest of the picture.

Aspect 28C—The apparatus of any of Aspects 21C-27C, wherein the means for coding comprises means for decoding, and wherein the apparatus further comprises: means for applying a post-processing technique to the picture in accordance with the value of the quality metric to form a processed picture; and means for displaying the processed picture.

Aspect 29C—The apparatus of any of Aspects 21C-28C, wherein the quality metrics message comprises a quality metrics supplemental enhancement information (SEI) message.

Aspect 30C—The apparatus of any of Aspects 21C-28C, wherein the quality metrics message comprises a quality metrics open bitstream unit (OBU).

Aspect 31C—A non-transitory computer-readable storage medium storing instructions that, when executed, cause one or more processors of a device configured to process video data to: receive a picture; and code a quality metrics message that includes a quality metric syntax element, wherein the quality metric syntax element indicates a value of a quality metric related to the picture.

Aspect 32C—The non-transitory computer-readable storage medium of Aspect 31C, wherein the instructions further cause the one or more processors to: code a quality metric type syntax element in the quality metrics message, wherein the quality metric type syntax element indicates a type of a quality metric, from among a plurality of types of quality metrics, indicated by the quality metric syntax element.

Aspect 33C—The non-transitory computer-readable storage medium of Aspect 32C, wherein the plurality of types of quality metrics includes a peak signal-to-noise ratio (PSNR).

Aspect 34C—The non-transitory computer-readable storage medium of Aspect 32, wherein the plurality of types of quality metrics includes two more of a peak signal-to-noise ratio (PSNR), a structural similarity index (SSIM), a multiscale structural similarity index (MS-SSIM), a video quality metric (VQM), a weighted PSNR (wPSNR), a weighted-to-spherically uniform PSNR (WS-PSNR), a sequence PSNR, a sequence wPSNR, or a sequence WS-PSNR.

Aspect 35C—The non-transitory computer-readable storage medium of any of Aspects 32C-34C, wherein the quality metric syntax element indicates the value of the quality metric indicated by the quality metric type syntax element.

Aspect 36C—The non-transitory computer-readable storage medium of any of Aspects 31C-35C, wherein the instructions further cause the one or more processors to: code a second quality metrics message that includes a second quality metric syntax element, wherein the second quality metric syntax element indicates a second value of a second quality metric related to a subpicture of the picture.

Aspect 37C—The non-transitory computer-readable storage medium of any of Aspects 31C-35C, wherein the instructions further cause the one or more processors to: code a second quality metrics message that includes a second quality metric syntax element, wherein the second quality metric syntax element indicates a second value of a second quality metric related to a region-of-interest of the picture.

Aspect 38C—The non-transitory computer-readable storage medium of any of Aspects 31C-37C, wherein the device is configured to decode the quality metrics message, and wherein the instructions further cause the one or more processors to: apply a post-processing technique to the picture in accordance with the value of the quality metric to form a processed picture; and display the processed picture.

Aspect 39C—The non-transitory computer-readable storage medium of any of Aspects 31C-38C, wherein the quality metrics message comprises a quality metrics supplemental enhancement information (SEI) message.

Aspect 40C—The non-transitory computer-readable storage medium of any of Aspects 31C-38C, wherein the quality metrics message comprises a quality metrics open bitstream unit (OBU).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a picture that includes a plurality of subpictures; and
   decoding a quality metrics supplemental enhancement information (SEI) message associated with the plurality of subpictures of the picture, the quality metrics SEI message including:
      a first syntax element indicative of a number of subpictures within the plurality of subpictures,
      a quality metric type syntax element, associated with at least one subpicture of the plurality of subpictures, set to a first value among a plurality of values that respectively indicate a plurality of types of quality metrics, where the first value is set to 0, and
      a quality metric syntax element specifying a second value;
   determining that the quality metric type syntax element is set to 0;
   based on the determination that the quality metric type syntax element is set to 0, determining to interpret the second value specified by the quality metric syntax element as a value indicative of a peak signal-to-noise ratio (PSNR) associated with the at least one subpicture; and
   deriving, based on the second value specified by the quality metric syntax element, a derived PSNR associated with the at least one subpicture.

2. The method of claim 1, wherein deriving the derived PSNR associated with the at least one subpicture comprises determining a quotient based on an integer value and the second value specified by the quality metric syntax element.

3. The method of claim 2, wherein the second value specified by the quality metric syntax element comprises a 16-bit unsigned integer and the integer value is 100.

4. The method of claim 3, wherein the plurality of types of quality metrics includes the PSNR and at least one of, a structural similarity index (SSIM), a weighted PSNR (wPSNR), or a weighted-to-spherically uniform PSNR (WS-PSNR).

5. The method of claim 3, further comprising:
   receiving a second picture that includes a second plurality of subpictures;
   decoding a second quality metrics SEI message associated with the second plurality of subpictures of the second picture, the second quality metrics SEI message including:
      a second syntax element indicative of a second number of subpictures within the second plurality of subpictures,
      a second quality metric type syntax element, associated with a second at least one subpicture of the second plurality of subpictures, set to a third value among the plurality of values that respectively indicate the plurality of types of quality metrics, where the third value is set to 1, and
      a second quality metric syntax element specifying a fourth value;
   determining that the second quality metric type syntax element is set to 1;
   based on the determination that the second quality metric type syntax element is set to 1, determining to interpret the fourth value specified by the second quality metric syntax element as a value indicative of a SSIM associated with the second at least one subpicture; and
   deriving, based on the fourth value specified by the second quality metric syntax element, a derived SSIM associated with the second at least one subpicture.

6. The method of claim 5, wherein deriving the derived SSIM associated with the second at least one subpicture comprises determining a second quotient based on a second integer value and the fourth value specified by the second quality metric syntax element.

7. The method of claim 3, the method further comprises:
   applying a post-processing technique to the at least one subpicture picture in accordance with the derived PSNR to form a processed picture; and
   displaying the processed picture.

8. An apparatus configured to process video data, the apparatus comprising:
   a memory configured to store a picture; and
   one or more processors implemented in circuitry and in communication with the memory, the one or more processors configured to:
      receive the picture, the picture including a plurality of subpictures; and
      decode a quality metrics supplemental enhancement information (SEI) message associated with the plurality of subpictures of the picture, the quality metrics SEI message including:
         a first syntax element indicative of a number of subpictures within the plurality of subpictures,
         a quality metric type syntax element, associated with at least one subpicture of the plurality of subpictures, set to a first value among a plurality of values that respectively indicate a plurality of types of quality metrics, where the first value is set to 0, and a quality metric syntax element specifying a second value;

determine that the quality metric type syntax element is set to 0;

based on the determination that the quality metric type syntax element is set to 0, determine to interpret the second value specified by the quality metric syntax element as a value indicative of a peak signal-to-noise ratio (PSNR) associated with the at least one subpicture; and derive, based on the second value specified by the quality metric syntax element, a derived PSNR associated with the at least one subpicture.

9. The apparatus of claim 8, wherein the one or more processors are further configured to:

determine a quotient based on an integer value and the second value specified by the quality metric syntax element.

10. The apparatus of claim 9, wherein the second value specified by the quality metric syntax element comprises a 16-bit unsigned integer and the integer value is 100.

11. The apparatus of claim 10, wherein the plurality of types of quality metrics includes the PSNR and at least one of a structural similarity index (SSIM) a weighted PSNR (wPSNR), or a weighted-to-spherically uniform PSNR (WS-PSNR).

12. The apparatus of claim 10, wherein the one or more processors are further configured to:

receive a second picture that includes a second plurality of subpictures;

decode a second quality metrics SEI message associated with the second plurality of subpictures of the second picture, the second quality metrics SEI message including:

a second syntax element indicative of a second number of subpictures within the second plurality of subpictures, a second quality metric type syntax element, associated with a second at least one subpicture of the second plurality of subpictures, set to a third value among the plurality of values that respectively indicate the plurality of types of quality metrics, where the third value is set to 1, and a second quality metric syntax element specifying a fourth value;

determine that the second quality metric type syntax element is set to 1;

based on the determination that the second quality metric type syntax element is set to 1, determine to interpret the fourth value specified by the second quality metric syntax element as a value indicative of a SSIM associated with the second at least one subpicture; and derive, based on the fourth value specified by the second quality metric syntax element, a derived SSIM associated with the second at least one subpicture.

13. The apparatus of claim 12, wherein the one or more processors are further configured to:

determine a second quotient based on a second integer value and the fourth value specified by the second quality metric syntax element.

14. The apparatus of claim 10, wherein the one or more processors are further configured to:

apply a post-processing technique to the at least one subpicture in accordance with the derived PSNR to form a processed picture; and display the processed picture.

15. An apparatus configured to process video data, the apparatus comprising:

means for receiving a picture that includes a plurality of subpictures; and means for decoding a quality metrics supplemental enhancement information (SEI) message associated with the plurality of subpictures of the picture, the quality metrics SEI message including:

a first syntax element indicative of a number of subpictures within the plurality of subpictures, a quality metric type syntax element, associated with at least one subpicture of the plurality of subpictures, set to a first value among a plurality of values that respectively indicate a plurality of types of quality metrics, where the first value is set to 0, and a quality metric syntax element specifying a second value;

means for determining that the quality metric type syntax element is set to 0;

based on the determination that the quality metric type syntax element is set to 0, means for determining to interpret the second value specified by the quality metric syntax element as a value indicative of a peak signal-to-noise ratio (PSNR) associated with the at least one subpicture; and means for deriving, based on the second value specified by the quality metric syntax element, a derived PSNR associated with the at least one subpicture.

16. The apparatus of claim 15, wherein the means for deriving the derived PSNR associated with the at least one subpicture comprises means for determining a quotient based on an integer value and the second value specified by the quality metric syntax element.

17. The apparatus of claim 16, wherein the second value specified by the quality metric syntax element comprises a 16-bit unsigned integer and the integer value is 100.

18. The apparatus of claim 16, wherein the plurality of types of quality metrics includes the PSNR and at least one of a structural similarity index (SSIM) a weighted PSNR (wPSNR), or a weighted-to-spherically uniform PSNR (WS-PSNR).

19. The apparatus of claim 17, further comprising:

means for receiving a second picture that includes a second plurality of subpictures;

means for decoding a second quality metrics SEI message associated with the second plurality of subpictures of the second picture, the second quality metrics SEI message including:

a second syntax element indicative of a second number of subpictures within the second plurality of subpictures, a second quality metric type syntax element, associated with a second at least one subpicture of the second plurality of subpictures, set to a third value among the plurality of values that respectively indicate the plurality of types of quality metrics, where the third value is set to 1, and a second quality metric syntax element specifying a fourth value;

means for determining that the second quality metric type syntax element is set to 1;

based on the determination that the second quality metric type syntax element is set to 1, means for determining to interpret the fourth value specified by the second quality metric syntax element as a value indicative of a SSIM associated with the second at least one subpicture; and means for deriving, based on the fourth value specified by the second quality metric syntax element, a derived SSIM associated with the second at least one subpicture.

20. The apparatus of claim 19, wherein the means for deriving the derived SSIM associated with the second at least one subpicture comprises means for determining a second quotient based on a second integer value and the fourth value specified by the second quality metric syntax element.

21. The apparatus of claim 17, further comprising:
means for applying a post-processing technique to the at least one subpicture in accordance with the derived PSNR to form a processed picture; and
means for displaying the processed picture.

22. A non-transitory computer-readable storage medium storing instructions that, when executed, cause one or more processors of a device configured to process video data to:
receive a picture that includes a plurality of subpictures; and
decode a quality metrics supplemental enhancement information (SEI) message associated with the plurality of subpictures of the picture, the quality metrics SEI message including:
a first syntax element indicative of a number of subpictures within the plurality of subpictures,
a quality metric type syntax element, associated with at least one subpicture of the plurality of subpictures, set to a first value among a plurality of values that respectively indicate a plurality of types of quality metrics, where the first value is set to 0, and
a quality metric syntax element specifying a second value;
determine that the quality metric type syntax element is set to 0;
based on the determination that the quality metric type syntax element is set to 0, determine to interpret the second value specified by the quality metric syntax element as a value indicative of a peak signal-to-noise ratio (PSNR) associated with the at least one subpicture; and
derive, based on the second value specified by the quality metric syntax element, a derived PSNR associated with the at least one subpicture.

23. The non-transitory computer-readable storage medium of claim 22, wherein the instructions further cause the one or more processors to:
determine a quotient based on an integer value and the second value specified by the quality metric syntax element.

24. The non-transitory computer-readable storage medium of claim 23, wherein the second value specified by the quality metric syntax element comprises a 16-bit unsigned integer and the integer value is 100.

25. The non-transitory computer-readable storage medium of claim 24, wherein the plurality of types of quality metrics includes the PSNR and at least one of a structural similarity index (SSIM) a weighted PSNR (wPSNR), or a weighted-to-spherically uniform PSNR (WS-PSNR).

26. The non-transitory computer-readable storage medium of claim 22, wherein the instructions further cause the one or more processors to:
receive a second picture that includes a second plurality of subpictures;
decode a second quality metrics SEI message associated with the second plurality of subpictures of the second picture, the second quality metrics SEI message including:
a second syntax element indicative of a second number of subpictures within the second plurality of subpictures,
a second quality metric type syntax element, associated with a second at least one subpicture of the second plurality of subpictures, set to a third value among the plurality of values that respectively indicate the plurality of types of quality metrics, where the third value is set to 1, and
a second quality metric syntax element specifying a fourth value;
determine that the second quality metric type syntax element is set to 1;
based on the determination that the second quality metric type syntax element is set to 1, determine to interpret the fourth value specified by the second quality metric syntax element as a value indicative of a SSIM associated with the second at least one subpicture; and
derive, based on the fourth value specified by the second quality metric syntax element, a derived SSIM associated with the second at least one subpicture.

27. The non-transitory computer-readable storage medium of claim 26, wherein the instructions further cause the one or more processors to:
determine a second quotient based on a second integer value and the fourth value specified by the second quality metric syntax element.

28. The non-transitory computer-readable storage medium of claim 24, wherein the instructions further cause the one or more processors to:
apply a post-processing technique to the at least one subpicture in accordance with the derived PSNR to form a processed picture; and
display the processed picture.

* * * * *